(12) United States Patent
Ebato et al.

(10) Patent No.: US 7,148,655 B2
(45) Date of Patent: Dec. 12, 2006

(54) ELECTRONIC EQUIPMENT, DISPLAY CONTROL METHOD, RECORDING MEDIUM AND PROGRAM

(75) Inventors: Satoshi Ebato, Tokyo (JP); Takashi Nunomaki, Tokyo (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 10/367,431

(22) Filed: Feb. 14, 2003

(65) Prior Publication Data
US 2003/0221134 A1 Nov. 27, 2003

(30) Foreign Application Priority Data
Feb. 15, 2002 (JP) ............................. 2002-037667

(51) Int. Cl.
*H02J 7/00* (2006.01)
(52) U.S. Cl. ........................ 320/132; 320/106; 324/428; 424/433
(58) Field of Classification Search ................ 320/106, 320/132, 134, 136; 324/428, 433; 429/61, 429/90
See application file for complete search history.

(56) References Cited

U.S. PATENT DOCUMENTS 5,640,081 A * 6/1997 Austin et al. ............... 320/127
6,329,794 B1 * 12/2001 Oeda et al. ................. 320/132
6,384,572 B1 * 5/2002 Nishimura .................. 320/106
6,433,512 B1 * 8/2002 Birkler et al. .............. 320/132
6,522,361 B1 * 2/2003 Higuchi et al. ............. 348/372
6,625,552 B1 * 9/2003 Delvecchio et al. .......... 702/63
6,664,792 B1 * 12/2003 Nguyen ...................... 324/433
2002/0113575 A1 * 8/2002 Lee ............................. 320/132

* cited by examiner

*Primary Examiner*—Karl Easthom
*Assistant Examiner*—Samuel Berhanu
(74) *Attorney, Agent, or Firm*—Frommer Lawrence Haug LLP; William S. Frommer

(57) ABSTRACT

A communication portion of a video camera receives expected power information of a printer from the printer, and also receives battery power information from a battery pack. When a microcomputer judges that there is any shift to a state where the power consumption amount under operating state is varied, that is, the printer is under a print standby state for printing operation, an operating portion reads out expected power information of the video camera under operation of the printer which is stored in advance is read out from the storage portion to calculate the expected power consumption amount of a video camera system under the operation of the printer on the basis of the expected power information of the printer received by the communication portion and the expected power information of the video camera read out, and the battery residual amount time is determined on the basis of the expected power consumption amount.

8 Claims, 12 Drawing Sheets

FIG. 6

| STATE OF VIDEO CAMERA | EXPECTED POWER DATA |
|---|---|
| PRINTER OPERATING STATE | xxW |
| STROBE OPERATING STATE | ΔΔW |
| ...... | ...... |
| ...... | ...... |

FIG. 12

| EXTERNAL EQUIPMENT ID | EXPECTED POWER DATA |
|---|---|
| 01 | ○○W |
| 03 | △△W |
| …… | …… |
| …… | …… |

ELECTRONIC EQUIPMENT, DISPLAY CONTROL METHOD, RECORDING MEDIUM AND PROGRAM

BACKGROUND OF THE INVENTION

1. Field of the Invention

The present invention relates to electronic equipment, a display control method, a recording medium and a program, and particularly to electronic equipment, a display control method, a recording medium and a program which can enhance reliability of display of a battery residual amount.

2. Description of the Related Art

There are known some battery packs each of which comprises a secondary cell such as a lithium ion battery, a NiCd (nickel cadmium) battery or a nickel hydride battery and contains a microcomputer and a battery internal state detecting circuit for communication battery power information, etc. to electronic equipment having a battery pack as a power source.

In such electronic equipment, a usable battery residual amount time is calculated on the basis of battery power information achieved from a battery and displayed. When power is varied, the battery power information is re-calculated after the power thus varied is stabilized. Accordingly, it takes time from the variation of the power to the renewal of the display of the usable battery residual amount time, however, if the power consumption amount is not sharply varied, users would not feel inconvenience from a practical standpoint.

Recently, there has frequently occurred such a case that external accessory equipment is connected to electronic equipment. When an accessory terminal of electronic equipment has a power supply line, external accessory equipment connected to the electronic equipment is supplied with power from the battery of the electronic equipment.

In the conventional electronic equipment, when power being actually used is not varied, display of the usable battery residual amount time is not renewed. Accordingly, for example when a printer is connected as external accessory, a user can check the battery residual amount time before the printer is actuated, however, the user cannot check how long the battery can be used when the printer is actually operated.

When the power consumption amount of external accessory equipment is small, the display of the battery residual amount time after renewal is not so greatly varied from the battery residual amount time before the renewal. However, when accessory equipment having a large power consumption amount such as a printer, a flash or the like is connected, the display of the battery residual amount time is varied to a remarkably smaller value as compared with the value before the renewal.

In such electronic equipment, when the battery residual amount is lower than a fixed value during a predetermined operation (for example, printing operation), an alarm indicating that the operation(printing operation) cannot be executed until the end is displayed.

However, when an alarm is displayed after the printer is actually operated, a user who believes on the basis of the check of the battery residual amount time before the actuation of the printer gets into a mess because the display of the battery residual amount time before the operation of the printer which has been already checked by the user is not conformed with the actual alarm display.

SUMMARY OF THE INVENTION

The present invention has been implemented in view of the foregoing situation, and has an object to enhance reliability of a battery residual amount display to an operational condition where the power consumption amount is large.

In order to attain the above object, according to a first aspect of the present invention, there is provided electronic equipment comprising: reception means for receiving battery power information from a battery, storage means for storing first expected power information; judgement means for judging whether there is any shift to a state where the power consumption amount under operation state is varied; read-out means for reading out the first expected power information from the storage means when it is judged by the judgement means that the operating state is shifted to the state where the power consumption amount is varied; calculation means for calculating a battery residual amount on the basis of the battery power information received by the reception means and the first expected power information read out from the read-out means; and display control means for controlling display of the battery residual amount calculated by the calculation means.

The first expected power information may be information corresponding to an operating state where the power consumption amount is larger than a reference value.

When it is judged by the judgment means that the operating state is not shifted to the state where the power consumption amount is varied, the calculation means may calculate the battery residual amount on the basis of only the battery power information received by the reception means.

The electric equipment further comprises connection means for connecting external equipment for supplying power of a battery, and achieving means for achieving second expected power information from the external equipment connected through the connection means, wherein the calculation means may calculate the battery residual amount on the basis of the battery power information received by the reception means, the first expected power information read out by the read-out means and the second expected power information achieved by the achieving means when it is judged by the judgment means that the operating state is shifted to the state where the power consumption amount is varied.

The storage means may store the second expected power information achieved by the achieving means in connection with the external equipment.

According to a second aspect of the present invention, there is provided a display control method comprising: a reception step of receiving battery power information from a battery; a judgment step of judging whether there is any shift to a state where a power consumption amount under operating state is varied; a read-out step of reading out expected power information stored in a memory when it is judged through the processing of the judgment step that the operating state is shifted to the state where the power consumption amount is varied; a calculation step of calculating a battery residual amount on the basis of the battery power information received through the processing of the reception step and the expected power information read out through the processing of the read-out step; and a display control step of controlling display of the battery residual amount calculated through the processing of the calculation step.

According to a third aspect of the present invention, there is provided a program of a recording medium comprising: a reception step of receiving battery power information from a battery; a judgment step of judging whether there is any shift to a state where a power consumption amount under operating state is varied; a read-out step of reading out expected power information stored in a memory when it is judged through the processing of the judgment step that the operating state is shifted to the state where the power consumption amount is varied; a calculation step of calculating a battery residual amount on the basis of the battery power information received through the processing of the reception step and the expected power information read out through the processing of the read-out step; and a display control step of controlling display of the battery residual amount calculated through the processing of the calculation step.

According to a fourth aspect of the present invention, there is provided a program which can be executed by a computer for controlling electronic equipment supplied with power from a battery mounted therein, comprising: a reception control step of controlling reception of battery power information from a battery; a judgment step of judging whether there is any shift to a state where a power consumption amount under operating state is varied; a read-out step of reading out expected power information stored in a memory when it is judged through the processing of the judgment step that the operating state is shifted to the state where the power consumption amount is varied; a calculation step of calculating a battery residual amount on the basis of the battery power information whose reception is controlled through the processing of the reception control step, and the expected power information read out through the processing of the read-out step; and a display control step of controlling display of the battery residual amount calculated through the processing of the calculation step.

In the electronic equipment, the display control method, the recording medium and the program of the invention, when the battery power information is received from the battery and it is judged that the operating state is shifted to the state where the power consumption amount is varied, the expected power information stored is read out, the battery residual amount is calculated on the basis of the battery power information received and the expected power information read out, and the display of the battery residual amount thus calculated is controlled.

BRIEF DESCRIPTION OF THE DRAWINGS

FIG. 6 is a diagram showing an example of the data base of the expected power amount of the video camera shown in FIG. 1;

FIG. 12 is a diagram showing another example of the data base of the expected power amount of the video camera shown in FIG. 1.

DETAILED DESCRIPTION OF THE PREFERRED EMBODIMENTS

Preferred embodiments according to the present invention will be described hereunder with reference to the accompanying drawings.

Figure 1:
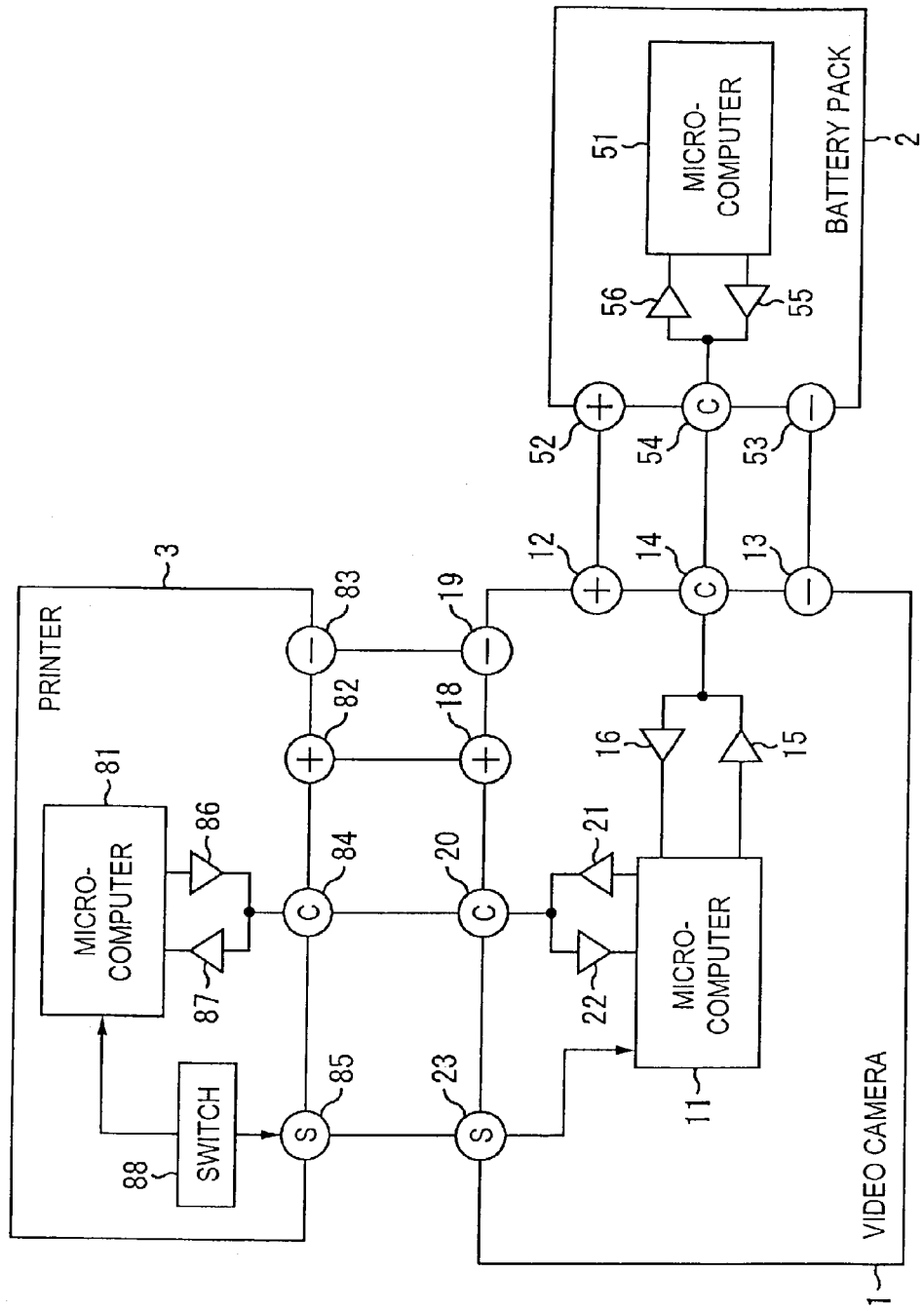
FIG. 1 is a diagram showing the construction of a video camera system to which the present invention is applied.

FIG. 1 shows an example of the construction of a camera-incorporated video tape recorder system (hereinafter referred to as video camera system) which comprises a camera-incorporated video tape recorder (hereinafter referred to as video camera) 1, a battery pack 2 and a printer 3.

In FIG. 1, each of the video camera 1, the battery pack 2 and the printer 3 has a microcomputer 11, a microcomputer 51 and a microcomputer 81.

The battery pack 2 is mounted in the video camera 1 to supply power to the video camera system. That is, the battery pack 2 supplies power to the video camera 1 through a plus terminal 52 connected to the plus terminal 12 of the video camera 1, and a minus terminal 53 connected to a minus terminal 13 of the video camera 1.

The microcomputer 51 of the battery pack 2 transmits its battery power information such as battery residual amount information, charged/discharged current detection information, battery cell voltage detection information or temperature detection information from a buffer amplifier 55 through a control terminal 54 to the video camera 1. In connection with this, the microcomputer 11 of the video camera 1 is supplied with the battery power information received through a control terminal 14 from a buffer amplifier 16. An instruction signal, etc. transmitted from the video camera 1 through the buffer amplifier 15 and the control terminal 14 are received to the battery pack 2 through the control terminal 54, and input through a buffer amplifier 56 to the microcomputer 51.

A printer 3 is connected to the video camera 1 through an external accessory terminal having a power supply line to print a video signal corresponding to an image picked up by the video camera 1. The accessory terminal having the power supply line is constructed by a plus terminal 82, a minus terminal 83, a control terminal 84 and a switch terminal 85. The plus terminal 82 of the printer 3 is connected to the plus terminal 18 of the video camera 1, the minus terminal 83 of the printer 3 is connected to the minus terminal 19 of the video camera 1, and the power of the battery pack 2 is supplied from the video camera 1 through these terminals to the printer 3.

The microcomputer 81 of the printer 3 transmits information on the expected power consumption amount of the printer 3 (hereinafter referred to as "expected power information"), etc. from the buffer amplifier 86 through the control terminal 84 to the video camera 1. The expected power information is received through a control terminal 20 by the video camera 1, and input through a buffer amplifier 22 to the microcomputer 11. The video signal, the instruction signal, etc. transmitted from the video camera 1 through the buffer amplifier 21 and the control terminal 20 are received through the control terminal 84 to the printer 3, and input through a buffer amplifier 87 to the microcomputer 81.

Furthermore, the printer 3 is equipped with a switch 88 which is turned on when a user opens a lid (not shown) of the printer 3 and sets printer sheets. A signal indicating turn-on of the switch 88 is transmitted to the microcomputer 81 of the printer 3, and also transmitted to the microcomputer 11 of the video camera 1 through the switch terminal 85 of the printer 3 and the switch terminal 23 of the video camera 1, whereby the microcomputers 11 and 81 can judge that the printer 3 is kept under a print standby state.

Figure 2:
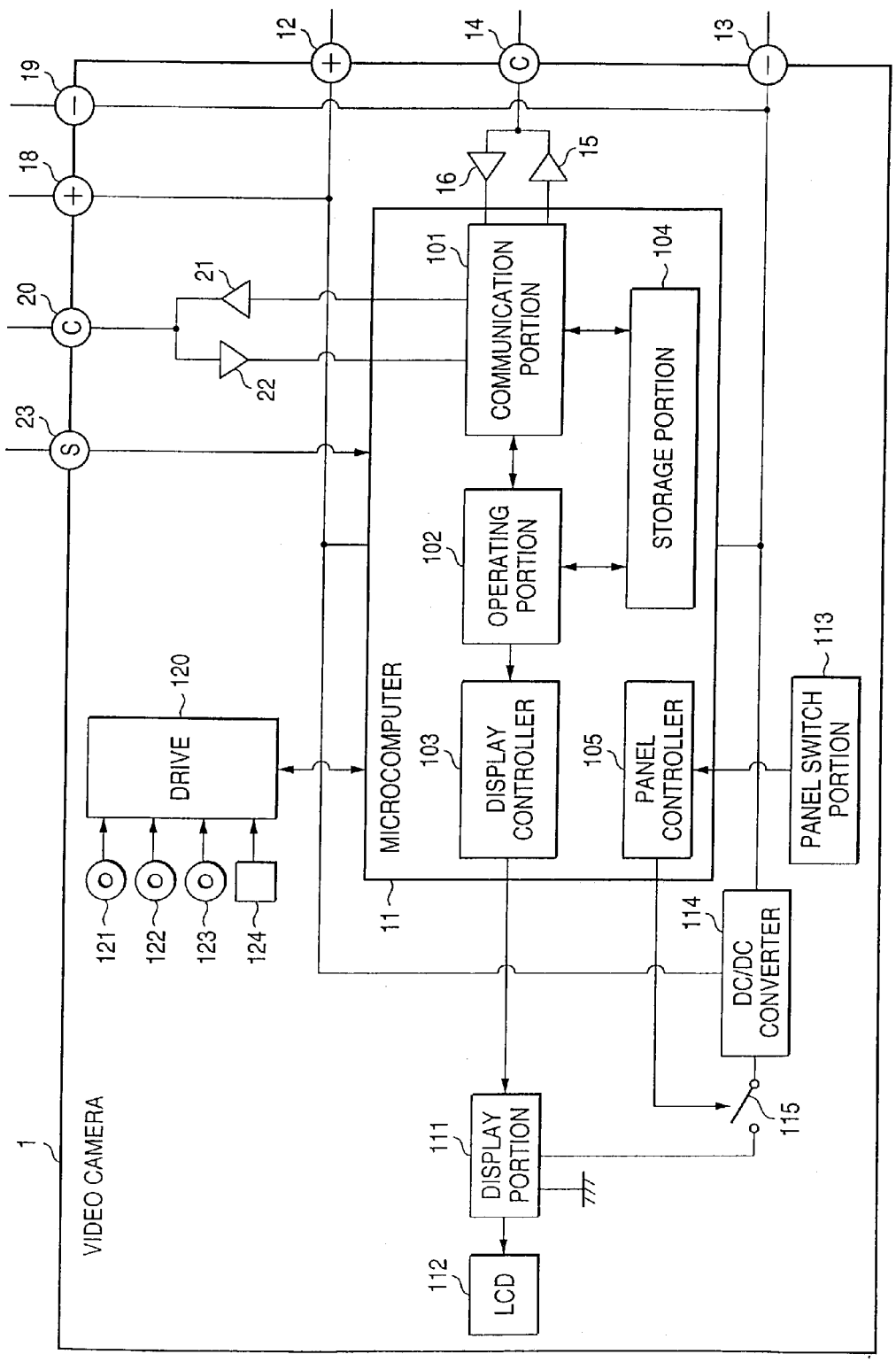
FIG. 2 is a block diagram showing the construction of the video camera shown in FIG. 1.

FIG. 2 is a block diagram showing the construction of the video camera 1. The same elements as described with reference to FIG. 1 are omitted from the following description in order to avoid duplicative description thereof.

The microcomputer 11 comprises a communication portion 101, an operating portion 102, a display controller 103, a storage portion 104 and a panel controller 105, and it controls the overall operation of the video camera 1 on the basis of user's operation or the like.

The communication portion 101 communicates with the battery pack 2 through the control terminal 14 (buffer amplifiers 15, 16), and communicates with the printer 3 through the control terminal 20 (buffer amplifiers 21, 22). The operating portion 102 calculates the battery residual amount on the basis of the battery power information from the battery pack 2 which is received by the communication portion 101, the expected power information from the printer 3 or the expected power information of the video camera 1 which is stored in the storage portion 104. The display controller 103 generates a display signal on the basis of the operation result of the operating portion 102, and outputs the display signal to a display portion 111.

The storage portion 104 is constructed by a memory or the like, and, in the video camera system, information on the expected power consumption amount of the video camera 1 (expected power information) which supports various operating states (for example, the operating state of the printer 3, etc.) under which the power consumption amount is larger than a reference value is stored in the storage portion 104 in advance.

The panel controller 105 turns on the switch 115 to supply power from a DC/DC converter 114 to the display portion 111 when a detection signal for detecting that a panel (not shown) having an LCD 112 of the video camera 1 mounted thereof is opened by a panel switch portion 113 is received, whereby the display portion 111 and the LCD 112 are supplied with power.

The display portion 111 drives LCD 112 on the basis of the display signal from the display controller 103, and LCD 112 displays the battery residual amount time, etc. on the basis of the display signal from the display controller 103. The DC/DC converter 114 supplies power to the display portion 111 and LCD 112 when the switch 115 is set to ON-state.

A drive 120 is connected to the microcomputer 11, a magnetic disc 121, an optical disc 122, a magneto optical disc 123 or a semiconductor memory 124 is mounted as occasion demands, and a computer program read out therefrom is installed into the storage portion 104 as occasion demands, or writing/reading of video signals is executed.

The video camera 1 has a constituent element for picking up images and various constituent elements for recording/reproducing video signals thus achieved through the image pickup, however, the descriptions of these constituent elements are omitted for convenience's sake of description in FIG. 2.

Figure 3:
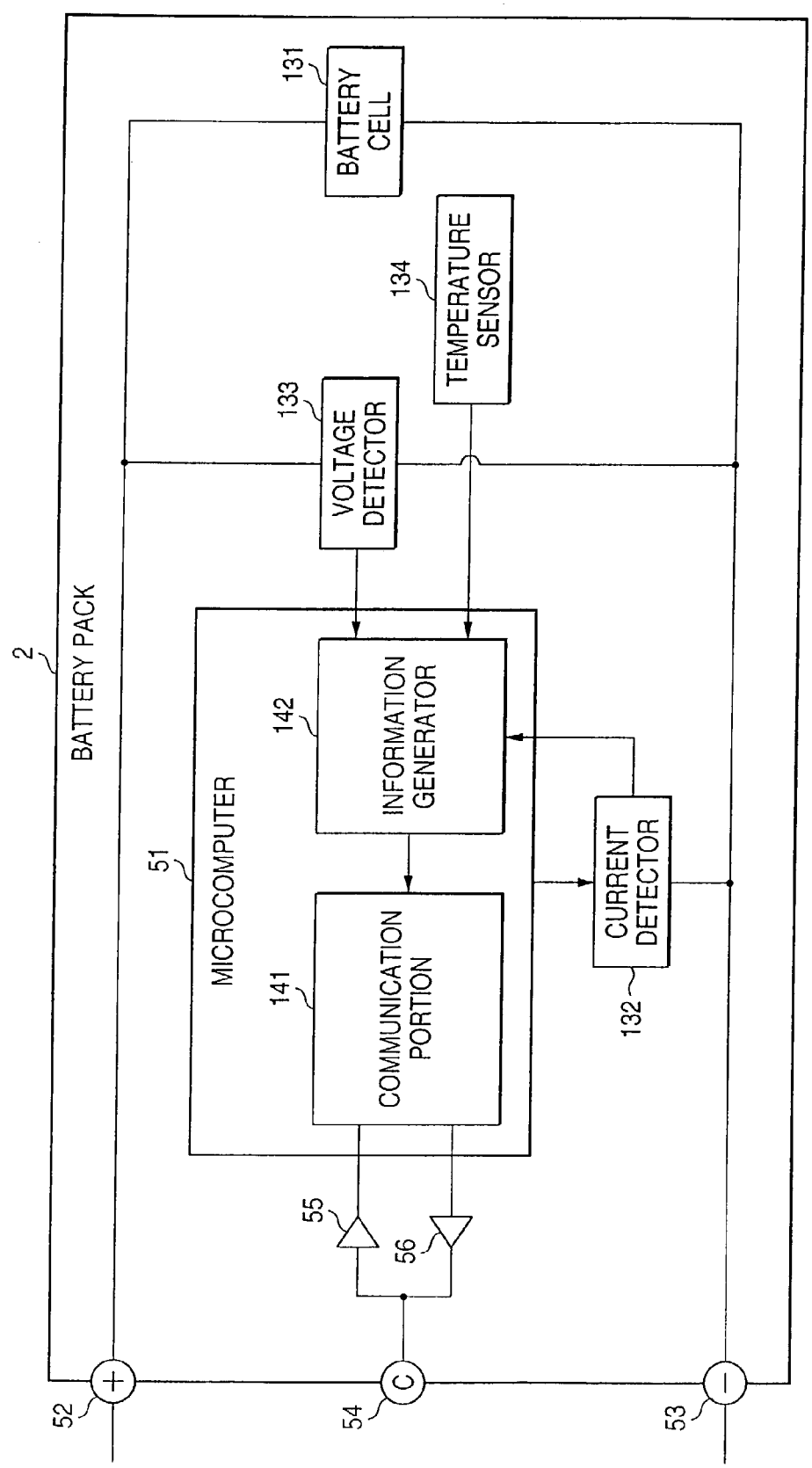
FIG. 3 is a block diagram showing the construction of a battery pack shown in FIG. 1.

FIG. 3 is a block diagram showing the construction of the battery pack 2. The same elements as described with reference to FIG. 1 are omitted from the following description in order to avoid duplicative description thereof.

The battery pack 2 comprises a microcomputer 51, a battery cell 131, a current detector 132 for detecting charged/discharged current, a voltage detector 133 for detecting the inter-terminal voltage of the battery cell 131 and a temperature sensor 134 for detecting the temperature of the battery cell 131.

The microcomputer 51 controls the overall operation of the battery pack 2 on the basis of an instruction from the video camera 1. The microcomputer 51 comprises a communication portion 141 for communicating with the video camera 1, and an information generator 142 for generating information indicating the state of the battery pack 2 on the basis of the information detected by the current detector 132, the voltage detector 133 or the temperature sensor 134. The information indicating the state of the battery pack 2 (hereinafter referred to as "battery power information") comprises battery residual amount information, charged/discharged current detection information, battery cell voltage detection information or temperature detection information of the battery pack 2, and the battery power information is transmitted through the control terminal 54 (buffer amplifier 56) to the video camera 1 by the communication portion 141.

Figure 4:
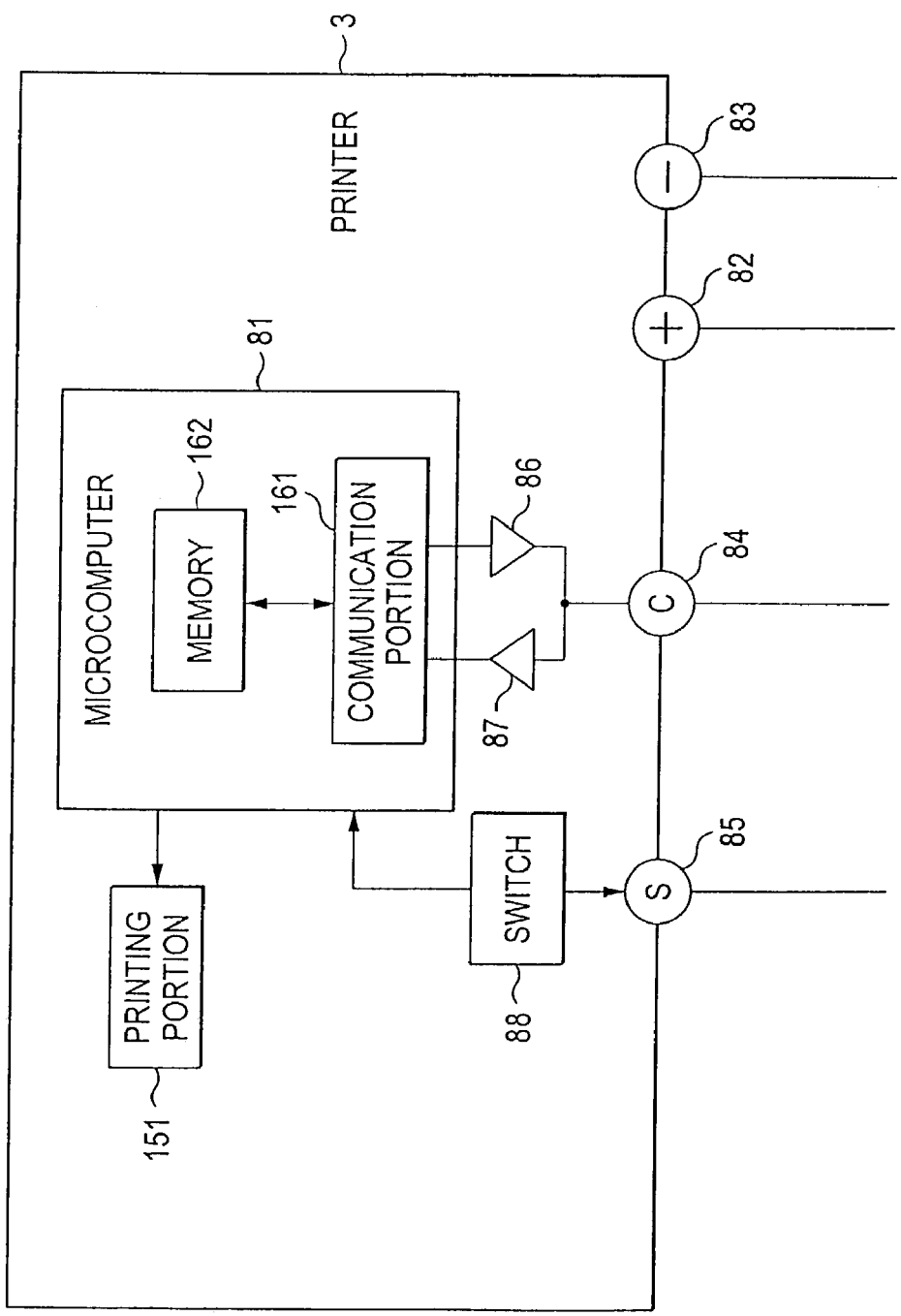
FIG. 4 is a block diagram showing the construction of a printer shown in FIG. 1.

FIG. 4 is a block diagram showing the construction of the printer 3. The same elements as described with reference to FIG. 1 are omitted from the following description in order to avoid duplicative description thereof.

The printer 3 comprises a microcomputer 81, a switch 88 and a printing portion 151.

The microcomputer 81 comprises a communication portion 161 and a memory 162, and controls the overall operation of the printer 3 on the basis of user's operation or an instruction from the video camera 1. The communication portion 161 of the microcomputer 81 receives through the control terminal 84 (buffer amplifiers 86, 87) an instruction signal from the microcomputer 11 of the video camera 1 or a video signal picked up by the video camera 1 which will be printed by the printer, or transmits to the video camera 1 expected power information at the operation time of the printer 3 which is stored in the memory 162 in advance. The microcomputer 81 controls the printing portion 151 to print the video signal received by the communication portion 161.

Next, the battery residual amount display processing of the video camera 1 will be described with reference to the flowchart of FIG. 5.

In step S1, the microcomputer 11 controls the communication portion 101 to access the printer 3 through the control terminal 20 and judges whether the printer 3 is connected to the video camera 1. When the printer 3 is connected to the video camera 1, in response to this access the microcomputer 81 of the printer 3 controls the communication portion 161 to transmit the expected power information of the printer 3 (in step S42 of FIG. 10 described later). Therefore, instep S2, the communication portion 101 receives the expected power information through the control terminal 20.

When the printer 3 is not connected to the video camera 1, no information is received through the control terminal 20, and thus the microcomputer 11 judges in step S1 that the printer 3 is not connected to the video camera 1 and skips the processing of the step S2.

In step S3, the microcomputer 11 controls the communication portion 101 to access the battery pack 2 through the control terminal 14 and judges whether it is possible to communicate with the battery pack 2. If it is possible to communicate with the battery pack 2, in response to this access the microcomputer 51 of the battery pack 2 controls the communication portion 141 to transmit the battery power information of the battery pack 2 (step S33 of FIG. 9 described later), so that the communication portion 101 receives the battery power information of the battery pack 2 through the control terminal 14 in step S4.

In step S5, the microcomputer 11 judges whether all the battery residual amount information (battery residual amount information, charged/discharged current detection information, battery cell voltage detection information or the temperature detection information) necessary to calculate the battery residual amount is achieved from the battery pack 2. If it is judged that the battery residual amount information for calculating the battery residual amount from the battery pack 2 is still insufficient, the microcomputer 11 returns to the step S4 and controls the communication portion 101 to repetitively receive the battery residual amount information of the battery pack 2 through the control terminal 14.

In step S5, the microcomputer 11 judges that all the battery residual amount information necessary to calculate the battery residual amount is achieved from the battery pack 2, the microcomputer 11 judges in step S6 whether the operating state is shifted to a state where the power consumption amount is varied in the video camera system. The power consumption amount in this case means a power consumption amount larger than a reference value pre-set in the video camera system. Accordingly, when the printer 3 is connected, the microcomputer 11 judges whether the printer 3 is set to a print standby state which will be shifted to a print operating state (a state where the power consumption amount under the operating state is greatly varied from the reference value). When the microcomputer 11 receives a signal indicating turn-on of the switch 88 from the switch 88 of the printer 3 through the switch terminal 23 (in step S44 of FIG. 10), the microcomputer 11 judges that the printer 3 is set to the print standby state and goes to step S7.

In step S7, the operating portion 102 reads out from the storage portion 104 the expected power consumption amount of the video camera 1 under the operation of the printer 3, which is stored in the storage portion 104 in advance. In this case, in the storage portion 104 are stored expected power information pieces of the video camera 1, which corresponds to various operating states (for example, the operating state of the printer 3, etc.) where the power consumption amount is larger than the reference value in the video camera system. For example, the expected power information (data) of the video camera 1 is stored in advance as data base in association with the operating state of the video camera 1 like the expected power when the operating state is "printer-operating state" (ID) is represented by xxW and the expected power when the operating state is "strobe-operating state" (ID) is represented by ΔΔW as shown in FIG. 6.

In step S8, the operating portion 102 calculates the expected power consumption amount W1 of the video camera system under the operation of the printer 3 on the basis of the expected power information of the printer 3 received by the communication portion 101 in the processing of the step S2 and the expected power information of the video camera 1 read out in step S7. That is, the expected power consumption amount W1 is calculated by the following equation (1):

$$\text{Expected power consumption amount } W1 = \text{expected power of printer} + \text{expected power of video camera} \quad (1)$$

The expected power consumption amount W1 when the video camera is not connected to the printer is represented by the expected power of video camera (expected power consumption amount W1=expected power of video camera).

On the other hand, when the microcomputer 11 does not receive any signal indicating turn-on of the switch 88 from the switch 88 of the printer 3 through the switch terminal 23, the microcomputer 11 judges in step S6 that in the video camera system the operating state is not shifted to a state where the power consumption amount is varied, that is, in this case, the printer 3 is not set to the print standby state (a state where the printer 3 is not kept under the print standby state, a state where the printer 3 is carrying out the printing operation or a state where the printer 3 is kept under a print-operation completed state), and the microcomputer 11 goes to step S9.

In step S9, the operating portion 102 calculates the current power consumption amount W2 on the basis of the battery power information of the battery pack 2 received by the communication portion 101 in the processing of the step S4. In this case, the power consumption amount W2 is calculated by the following equation (2).

$$\text{Power consumption amount } W2 = \text{current } I \times \text{voltage } V \quad (2)$$

For example, the current I is determined on the basis of the charged/discharged current information detected by the current detector 132 of the battery pack 2, and the voltage V is determined on the basis of the battery cell inter-terminal voltage information detected by the voltage detector 133.

In step S10, the operating portion 102 calculates the battery residual amount time R on the basis of the battery power information of the battery pack 2 received in the processing of the step S4 and the expected power consumption amount W1 calculated in the step S8 or the power consumption amount W2 calculated in the step S9. The battery residual amount time R is determined by the following equation (3). Accordingly, if it is judged that there is no shift to a state where the power consumption amount under operating state is varied, the battery residual amount time R is calculated on the basis of only the battery power information.

$$R = Qd \times f(W) \quad (3)$$
$$= (Q - g(W)) \times f(W)$$

In the equation (3), the battery residual amount time R represents the time elapsing until the battery is terminated, Qd represents a discharged current integrated value until the battery is terminated, W represents the power consumption amount, f(W) represents a power dependence coefficient, Q represents a discharged current integrated residual amount and g(W) represents a residual amount when the battery is terminated. The expected power consumption amount W1 or the power consumption amount W2 is substituted into W in the equation (3) to calculate the battery residual amount time R.

In step S11, the display controller 103 generates a display signal on the basis of the information of the battery residual amount time R thus calculated, and outputs the display signal to the display portion 111. The display portion 111 controls LCD 12 to display a residual amount time display frame as shown in FIG. 7.

Figure 7:
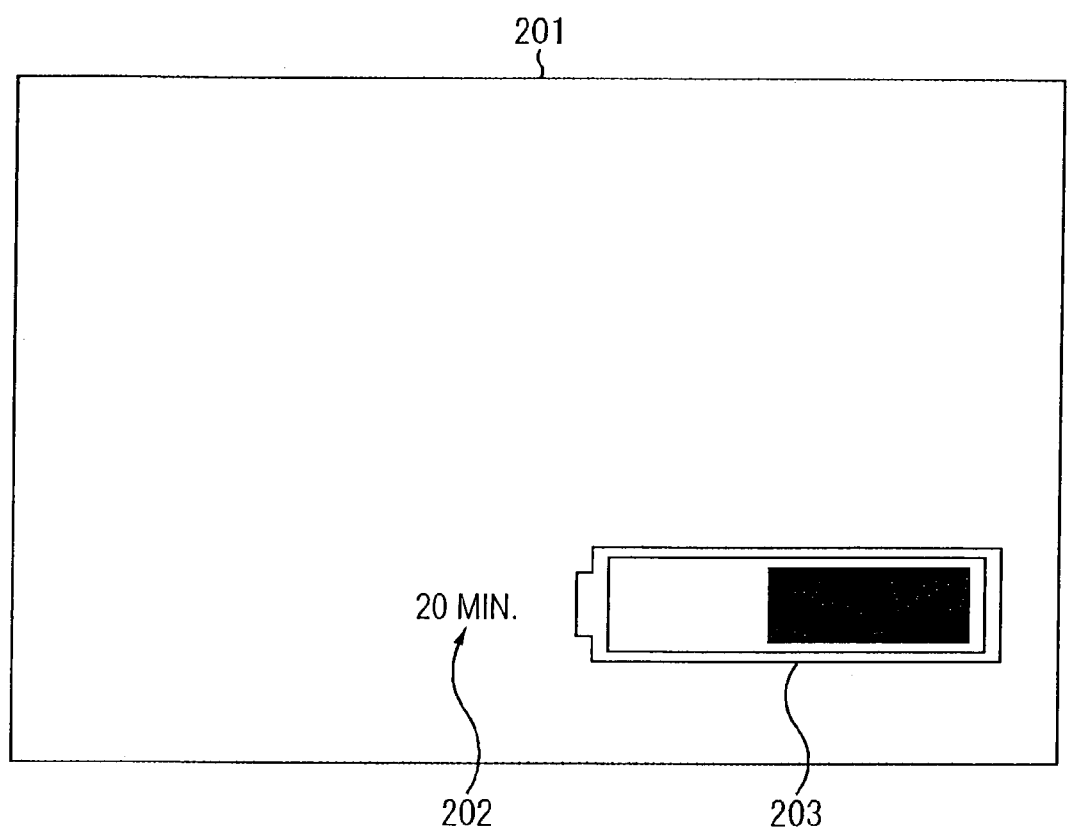
FIG. 7 is a diagram showing a display example of a battery residual amount display frame.

FIG. 7 shows an example of the battery residual amount time display frame of the video camera system.

A display frame 201 comprises a time display portion 202 and a level display portion 203. The time display portion 202 indicates the battery residual amount time (the time for which the video camera system can be driven by the battery) with numerals, and the level display portion 203 displays the rate of the battery residual amount time calculated in the step S10 while the rate of the battery residual amount time is visualized to be intuitively recognized with the level of the battery fully-charged state set to 100%. The level display portion 203 may be designed to vary its display at four levels or more or continuously in accordance with the battery residual amount time.

On the other hand, when it is impossible to communicate with the battery pack 2, no signal is detected at the control terminal 14. Therefore, the microcomputer 11 judges in step S3 that it is impossible to communicate with the battery pack 2, and the battery residual amount display processing is finished. The case where it is impossible to communicate with the battery pack 2 corresponds to such a case that the battery pack 2 is not loaded and alternative current is taken through a power source adapter (not shown).

Just after the printer 3 is connected to the video camera 1 and the print standby state is established, the actual battery residual amount time display is switched to the battery residual amount time display based on the expected power information under the printing operation. Therefore, a user can check the round value of the battery operation time under the print-operating state, and the printing work can be performed with safety. Accordingly, the unconformity between the battery residual amount time display and the alarm display when the battery residual amount under the print operation is lower than a fixed value can be suppressed.

Figure 8:
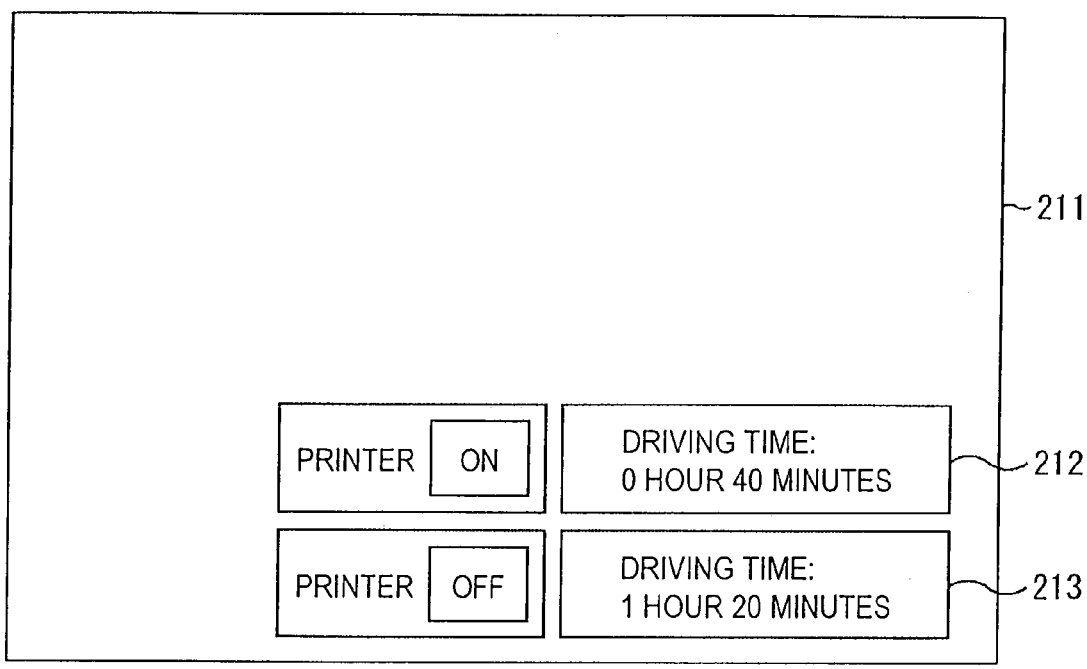
FIG. 8 is a diagram showing another display example of the battery residual amount display frame.

Furthermore, in step S10, the battery residual amount time R1 and the battery residual amount time R2 which are based on the expected power consumption amount W1 calculated in step S8 and the power consumption amount W2 calculated in step S9 may be calculated to display a display frame 211 as shown in FIG. 8 on LCD 112.

In FIG. 8, the display frame 211 comprises an expected display portion 212 and an actual state display portion 213. The expected display portion 212 indicates the display (the display under the ON-state of the printer, that is, under the state where the printing is started by the printer 3) of the battery residual amount time R1 calculated on the basis of the expected power consumption amount W1 determined in step S8, and the actual state display portion 213 indicates the display (the display under the OFF-state of the printer, that is, under the state where the printing is not carried out by the printer 3) of the battery residual amount time R2 calculated on the basis of the power consumption amount W2 determined in step S9.

With this indication, the round value of the battery residual amount time of the video camera system can be compared between the case where the printing operation of the printer 3 is carried out and the case where the printing operation is not carried out, and thus a guide to the optimum using method can be provided to a user.

Figure 9:
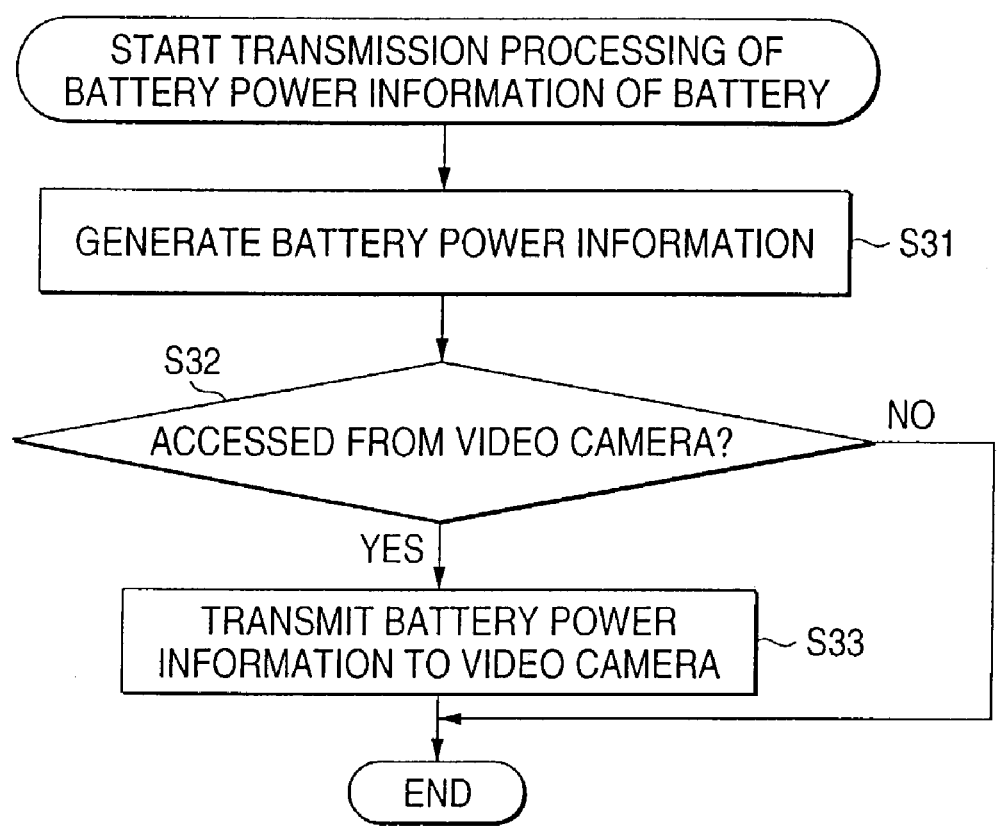
FIG. 9 is a flowchart showing the transmission processing of battery residual amount information of the battery pack shown in FIG. 1.

Next, the transmission processing of the battery power information of the battery pack 2 which corresponds to the above processing of the video camera 1 will be described with reference to the flowchart of FIG. 9.

In step S31, the information generator 142 achieves information detected by the current detector 132, the voltage detector 133 and the temperature sensor 134 to generate the battery power information.

Figure 5:
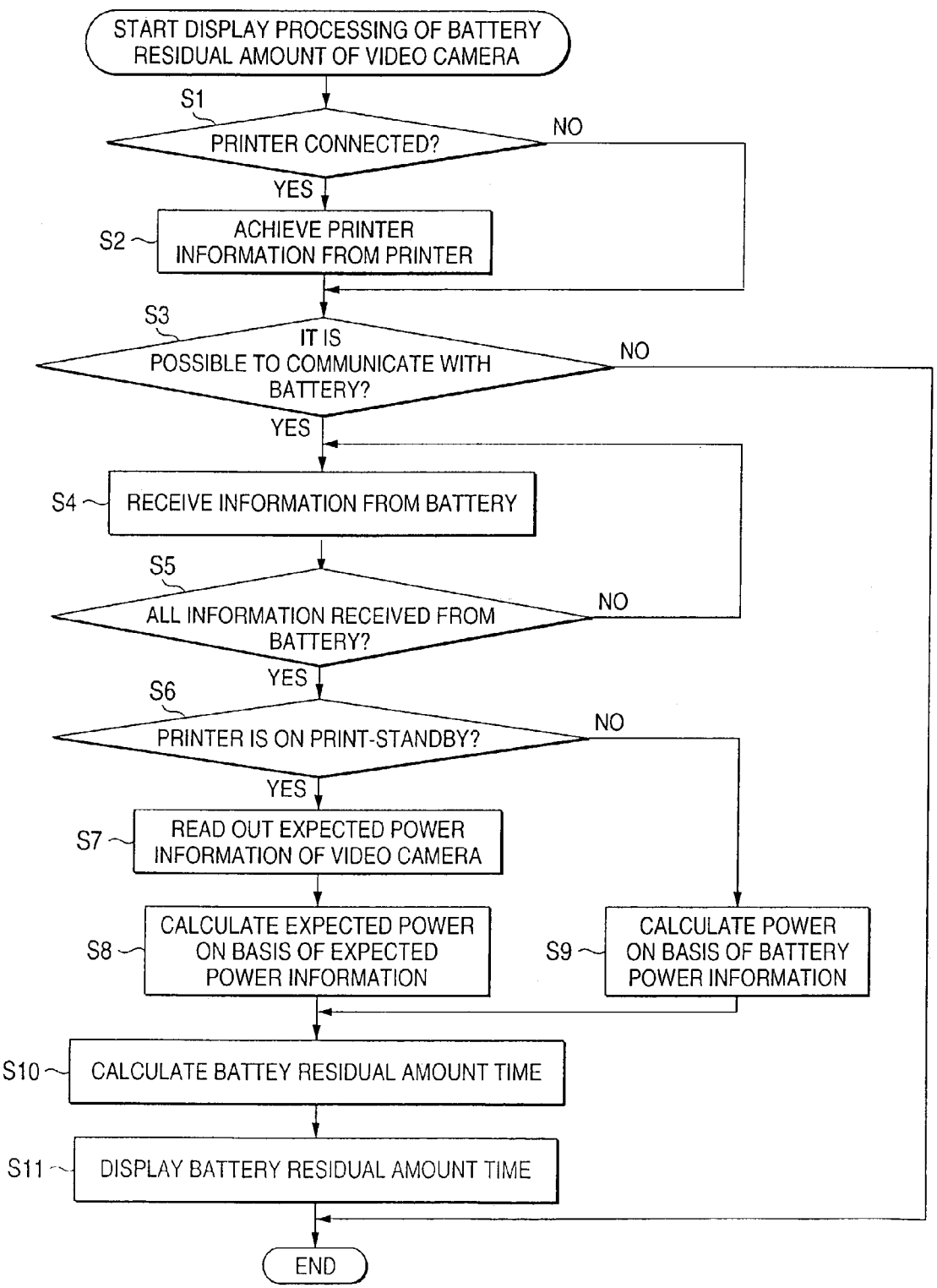
FIG. 5 is a flowchart showing the battery residual amount display processing of the video camera shown in FIG. 1.

In step S32, the microcomputer 51 judges whether there is any access from the video camera 1 (step S3 of FIG. 5). If it is judged in step S33 that an access is made from the video camera 1, the communication portion 141 transmits the battery power information generated by the information generator 142 through the control terminal 54 to the video camera 1. If it is judged in step S32 that no access is made from the video camera 1, the processing of the step S33 is skipped.

Figure 10:
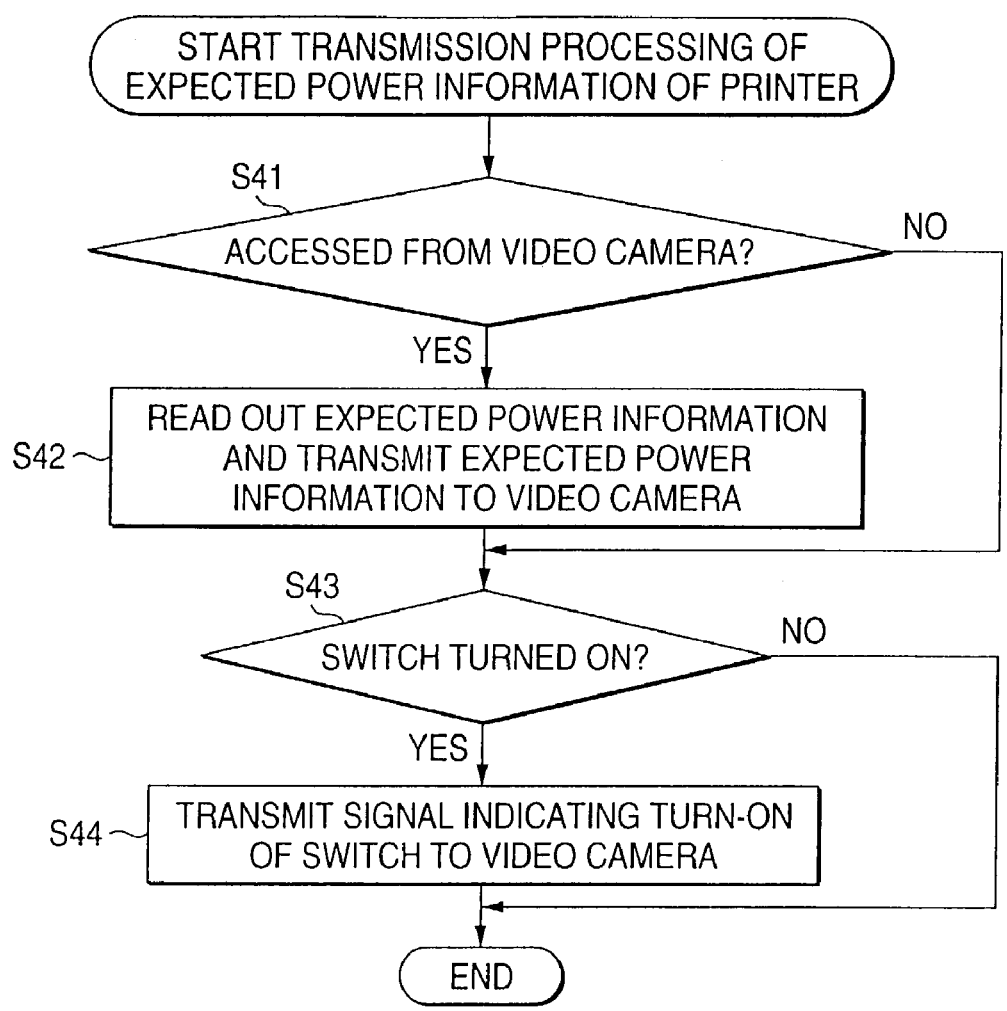
FIG. 10 is a flowchart showing the transmission processing of expected power information of a printer shown in FIG. 1.

Furthermore, the transmission processing of the expected power information of the printer 3 which corresponds to the above processing of the video camera 1 will be described with reference to the flowchart of FIG. 10.

In step S41, it is judged by the microcomputer 81 whether there is any access from the video camera 1 (step S1 of FIG. 5). If it is judged that an access is made from the video camera 1, in step S42 the communication portion 161 reads out the expected power information of the printer 3 stored in the memory 162, and transmits it to the video camera 1 through the control terminal 84. If it is judged in step s41 whether no access is made from the video camera 1, the processing of the step S42 is skipped.

In step S43, it is judged by the switch 88 whether the switch 88 is turned on. In this case, on the basis of the fact that the lid of the printer 3 is opened by the user and print sheets are set, it is judged whether the switch 88 is turned on. If it is judged in step S43 that the switch 88 is turned on, in step S44 the switch 88 transmits a signal indicating turn-on of the switch 88 to the microcomputer 11 of the video camera 1 through the switch terminal 85, whereby the microcomputer 11 of the video camera 1 can judge in step S6 of FIG. 5 that the printer 3 is kept under the print standby state.

If the turn-on of the switch 88 is not judged in step S43, the processing of the step S44 is skipped.

In the foregoing description, the printer 3 serving as external equipment is connected to the video camera 1, however, the same effect can be achieved for another external equipment connected to an external accessory terminal having a power supply line such as a video light, a strobe or the like.

The present invention is not limited to the case where external equipment is connected to the video camera. For example, with respect to a video camera 1 in which a memory still image pickup function, a network connection function or the like is being used, there may be a case where the video camera 1 is under such a state that the power consumption amount is not necessarily fixed (that is, the state where the power consumption amount is greatly varied from the reference value). If an expected average power consumption amount when such a function is used is stored in the data base of the recording portion 104 in advance, the precision of the battery residual amount during the operation of the video camera 1 under the state where the power consumption amount is not constant can be enhanced.

Figure 11:
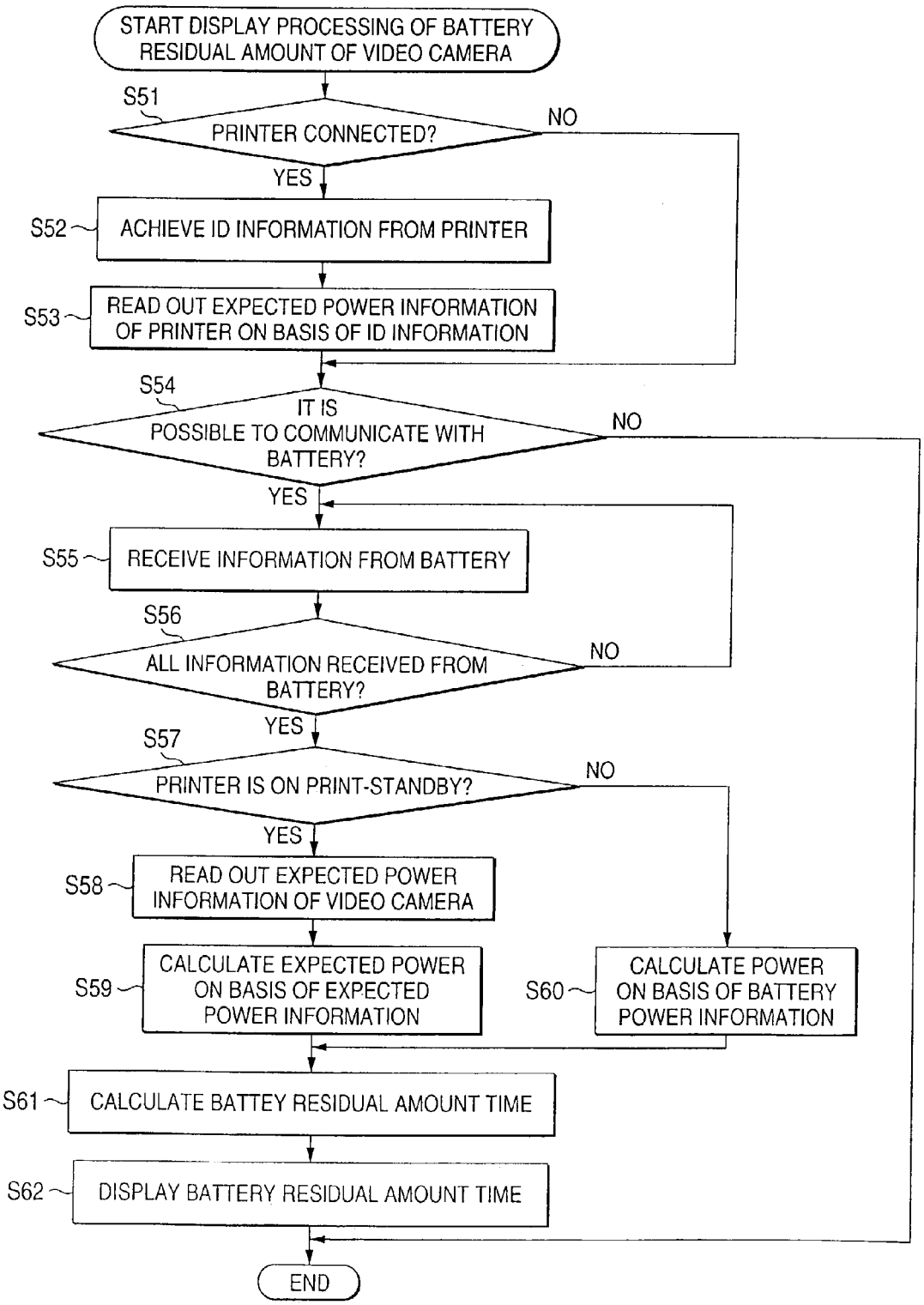
FIG. 11 is a flowchart showing another example of the battery residual amount display processing of the video camera shown in FIG. 1.

Next, another example of the battery residual amount display processing of the video camera 1 will be described with reference to the flowchart of FIG. 11. The processing from steps S54 to S62 is identical to the processing from steps S3 to S11 of FIG. 5, and the description thereof is omitted as occasion demands in order to avoid duplicative description.

In step S51, the microcomputer 11 controls the communication portion 101 to access the printer 3 through the control terminal 20 and judges whether the printer 3 is connected to the video camera 1. When the printer 3 is connected, in response to this access, the microcomputer 81 of the printer 3 controls the communication portion 161 to transmit ID information of the printer 3. Therefore, in step S52, the communication portion 101 receives the ID information through the control terminal 20.

In step S53, the microcomputer 11 reads out from the storage portion 104 the expected power amount information corresponding to the ID information thus received. In this case, as shown in FIG. 12, the expected power amount information (data) of other external equipment connected to the video camera 1 in addition to the printer 3 is stored in association with the ID information of the other external equipment concerned as a data base in the storage portion 104 in advance like the expected power of external equipment having ID information "01" is "OOW" and the expected power of external equipment having ID information "02" is "ΔΔW".

When the printer 3 is not connected to the video camera 1, no signal is received at the control terminal 20, so that the microcomputer 11 judges in step S51 that the printer 3 is not connected to the video camera 1 and thus the processing of the steps S52 and S53 is skipped.

The battery power information is achieved from the battery 2 through the processing from the step S54 to the step S56, and when it is judged in step S57 that the printer 3 is kept under the print standby state, the operating portion 102 reads out in the step S58 from the storage portion 104 the expected power of the video camera 1 under the operation of the printer 3, which is stored in the storage portion 104 in advance. In step S59, the operating portion 102 calculates the expected power consumption amount W1 under the operation of the printer 3 on the basis of the expected power information of the printer 3 read out from the storage portion 104 in the processing of the step S53 and the expected power information of the video camera 1.

As described above, the expected power of the external equipment may be stored as a data base in the video camera 1 in advance. When the expected power information corresponding to the ID information of external equipment connected to the video camera 1 does not exit in the storage portion 104 (for example, in such a case that the external equipment concerned is a new product), the expected power information achieved from the external equipment concerned may be added to the data base in the storage portion 104.

Furthermore, a constant battery residual amount display precision can be kept by varying the power consumption amount calculating method serving as a standard for the battery residual amount calculation in accordance with various operating states of electronic equipment.

As described above, when the power consumption is constant or stable, the battery residual amount is calculated and displayed by using the actual power consumption amount information. On the other hand, when the battery residual amount display is early renewed in accordance with power variation (for example, in a case where there is any shift to a state where the power consumption amount under operating state is varied), the battery residual amount is calculated and displayed by using expected power consumption amount information. Therefore, the user can instantaneously check the battery expected driving time for an operating state having a large power consumption amount such as the printer-operating state.

The foregoing description relates to the video camera system. However, the present invention may be applied to a digital still camera, a portable personal computer, etc. in which a battery residual amount display is made.

A series of processing as described above can be performed by hardware, but may be also performed by software. When the series of processing is performed by software, a program constituting the software is installed from a program-stored medium into a computer installed in dedicated hardware, or a general personal computer or the like which can execute various functions by installing various programs therein.

The program-stored medium, as shown in FIG. 2, for storing a program which can be executed by a computer while installed in the computer may be constructed by a package medium such as a magnetic disc 121 (containing a flexible disc), an optical disc 122 (containing CD-ROM (Compact Disc-Read Only Memory), DVD (Digital Versatile Disc), a magnetooptical disc 123 (containing MD(Mini-Disc) (trademark)), or a semiconductor memory 124 (memory stick (registered trademark), or a storage portion 104 in which the program is temporarily or permanently stored.

In the specification, steps describing a program recorded in a recording medium may be processed in time sequence in accordance with the described order, however, they are not necessarily processed in time sequence and may be executed in parallel or individually.

In the specification, the system represents the overall apparatus constructed by plural devices.

As described above, according to the present invention, the battery expected residual amount for an operating state having a large power consumption amount can be simply checked. Furthermore, reliability of the battery residual amount display can be enhanced.

What is claimed is:

1. Electronic equipment supplied with power from a battery mounted therein comprising:
   reception means for receiving battery power information from a battery, storage means for storing first expected power information;
   judgement means for judging whether there is any shift to a state where the power consumption amount under operating state is varied;
   read-out means for reading out the first expected power information from the storage means when it is judged by the judgement means that the operating state is shifted to the state where the power consumption amount is varied;
   calculation means for calculating a battery residual amount on the basis of the battery power information received by the reception means and the first expected power information read out from the read-out means; and
   display control means for controlling display of the battery residual amount calculated by the calculation means.

2. The electronic equipment as claimed in claim 1, wherein the first expected power information is information corresponding to an operating state where the power consumption amount is larger than a reference value.

3. The electronic equipment as claimed in claim 1, wherein when it is judged by the judgment means that the operating state is not shifted to the state where the power consumption amount is varied, the calculation means calculates the battery residual amount on the basis of only the battery power information received by the reception means.

4. The electric equipment as claimed in claim 1, further comprising connection means for connecting external equipment for supplying power of a battery, and achieving means for achieving second expected power information from the external equipment connected through the connection means, wherein the calculation means may calculate the battery residual amount on the basis of the battery power information received by the reception means, the first expected power information read out by the read-out means and the second expected power information achieved by the achieving means when it is judged by the judgment means that the operating state is shifted to the state where the power consumption amount is varied.

5. The electronic equipment as claimed in claim 4, wherein the storage means stores the second expected power information achieved by the achieving means in connection with the external equipment.

6. A display control method for electronic equipment supplied with power from a battery mounted therein, comprising:
   a reception step of receiving battery power information from a battery;
   a judgment step of judging whether there is any shift to a state where a power consumption amount under operating state is varied;
   a read-out step of reading out expected power information stored in a memory when it is judged through the processing of the judgment step that the operating state is shifted to the state where the power consumption amount is varied;
   a calculation step of calculating a battery residual amount on the basis of the battery power information received through the processing of the reception step and the expected power information read out through the processing of the read-out step; and
   a display control step of controlling display of the battery residual amount calculated through the processing of the calculation step.

7. A program embedded on a computer readable medium for electronic equipment supplied with power from a battery mounted therein, comprising:
   a reception step of receiving battery power information from a battery;
   a judgment step of judging whether there is any shift to a state where a power consumption amount under operating state is varied;
   a read-out step of reading out expected power information stored in a memory when it is judged through the processing of the judgment step that the operating state is shifted to the state where the power consumption amount is varied;
   a calculation step of calculating a battery residual amount on the basis of the battery power information received through the processing of the reception step and the expected power information read out through the processing of the read-out step; and
   a display control step of controlling display of the battery residual amount calculated through the processing of the calculation step.

8. A program embedded on a computer readable medium which can be executed by a computer for controlling electronic equipment supplied with power from a battery mounted therein, characterized in that the program contains:
   a reception control step of controlling reception of battery power information from a battery;
   a judgment step of judging whether there is any shift to a state where a power consumption amount under operating state is varied;
   a read-out step of reading out expected power information stored in a memory when it is judged through the processing of the judgment step that the operating state is shifted to the state where the power consumption amount is varied;
   a calculation step of calculating a battery residual amount on the basis of the battery power information whose reception is controlled through the processing of the reception control step, and the expected power information read out through the processing of the read-out step; and
   a display control step of controlling display of the battery residual amount calculated through the processing of the calculation step.

* * * * *